(12) United States Patent
Eavenson, Sr. et al.

(10) Patent No.: US 11,034,400 B2
(45) Date of Patent: *Jun. 15, 2021

(54) DRIVE SPROCKET FOR A TRACKED VEHICLE

(71) Applicant: MTD PRODUCTS INC, Valley City, OH (US)

(72) Inventors: Jimmy N. Eavenson, Sr., Aurora, OH (US); Peter Joseph Buchanan, Elyria, OH (US)

(73) Assignee: MTD PRODUCTS INC, Valley City, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/224,749

(22) Filed: Dec. 18, 2018

(65) Prior Publication Data

US 2019/0135357 A1 May 9, 2019

Related U.S. Application Data

(63) Continuation of application No. 15/381,003, filed on Dec. 15, 2016, now Pat. No. 10,155,554, which is a continuation of application No. 14/484,993, filed on Sep. 12, 2014, now Pat. No. 9,688,324.

(60) Provisional application No. 61/877,584, filed on Sep. 13, 2013.

(51) Int. Cl.
*B62D 55/125* (2006.01)
*B62D 55/12* (2006.01)
*F16H 55/30* (2006.01)

(52) U.S. Cl.
CPC ........... *B62D 55/125* (2013.01); *B62D 55/12* (2013.01); *F16H 55/30* (2013.01)

(58) Field of Classification Search
CPC ........ B62D 55/125; B62D 55/12; F16H 55/30
USPC ........................................................ 301/199
See application file for complete search history.

(56) References Cited

U.S. PATENT DOCUMENTS

| | | |
|---|---|---|
| 1,836,446 A | 12/1931 | Christie |
| 2,719,062 A | 9/1955 | Arps |
| 2,779,636 A | 1/1957 | Allen |
| 3,183,016 A | 5/1965 | Gustafsson |

(Continued)

FOREIGN PATENT DOCUMENTS

| | | |
|---|---|---|
| CN | 1760076 | 4/2006 |
| CN | 202491864 | 10/2012 |

(Continued)

OTHER PUBLICATIONS

US 9,008,928 B2, 04/2015, Oishi (withdrawn)

(Continued)

*Primary Examiner* — S. Joseph Morano
*Assistant Examiner* — Jean W Charleston
(74) *Attorney, Agent, or Firm* — Wegman Hessler

(57) ABSTRACT

A drive sprocket for driving a track of a tracked vehicle is provided. The drive sprocket includes an interior ring, an exterior ring, and an intermediate ring situated between the interior ring and the exterior ring. The interior ring, exterior ring, and intermediate ring are oriented in a substantially spaced-apart manner, each of the rings have an outer peripheral surface. A plurality of rods is attached to the rings adjacent to the outer peripheral surface thereof. The interior, exterior, and intermediate rings have a substantially "U" or "J" shape.

23 Claims, 11 Drawing Sheets

(56) References Cited

U.S. PATENT DOCUMENTS

| | | | |
|---|---|---|---|
| 3,216,520 A | 11/1965 | Blonsky | |
| 3,435,908 A | 4/1969 | Oldenburg | |
| 3,664,449 A | 5/1972 | Vardell | |
| 3,666,034 A | 5/1972 | Stuller | |
| 3,744,583 A | 7/1973 | Bedard | |
| 3,756,335 A | 9/1973 | Eisele | |
| 3,789,942 A | 2/1974 | Kowalik | |
| 3,826,388 A | 7/1974 | Oldenburg | |
| 3,860,079 A | 1/1975 | Hoffman | |
| 3,888,132 A | 6/1975 | Russ, Sr. | |
| 3,933,213 A | 1/1976 | Trowbridge | |
| 3,938,605 A | 2/1976 | Koch | |
| 3,938,606 A | 2/1976 | Yancey | |
| 3,948,331 A | 4/1976 | Esch | |
| 4,003,608 A * | 1/1977 | Carter | B62D 55/08 305/196 |
| 4,043,417 A | 8/1977 | Orpana | |
| 4,166,511 A | 9/1979 | Stedman | |
| 4,202,564 A | 5/1980 | Strader | |
| 4,221,272 A | 9/1980 | Kell | |
| 4,304,313 A | 12/1981 | van der Lely | |
| 4,325,443 A | 4/1982 | Fischer | |
| 4,378,133 A | 3/1983 | Trautwein | |
| 4,458,955 A | 7/1984 | Webb | |
| 4,462,480 A | 7/1984 | Yasui | |
| 4,501,452 A | 2/1985 | Huang | |
| 4,513,833 A | 4/1985 | Sheldon | |
| 4,566,553 A | 1/1986 | McCutcheon | |
| 4,618,015 A | 10/1986 | Yochum | |
| 4,683,970 A | 8/1987 | Smith | |
| 4,706,769 A | 11/1987 | Latourelle | |
| 4,953,919 A | 9/1990 | Langford | |
| 4,987,965 A | 1/1991 | Bourret | |
| 5,258,912 A | 11/1993 | Ghoneim | |
| 5,273,126 A | 12/1993 | Reed | |
| 5,295,917 A | 3/1994 | Hannum | |
| 5,316,381 A | 5/1994 | Isaacson | |
| 5,318,141 A | 6/1994 | Hansen | |
| 5,323,866 A | 6/1994 | Simard | |
| 5,372,212 A | 12/1994 | Davis | |
| 5,393,134 A | 2/1995 | Oertley | |
| 5,409,075 A | 4/1995 | Nieman | |
| 5,409,305 A | 4/1995 | Nagorcka | |
| 5,575,347 A | 11/1996 | Uchibaba | |
| 5,607,210 A | 3/1997 | Brazier | |
| 5,622,234 A | 4/1997 | Nagorcka | |
| 5,727,643 A | 3/1998 | Kawano | |
| 5,791,429 A | 8/1998 | Bergman | |
| 5,860,486 A | 1/1999 | Boivin | |
| 5,899,541 A * | 5/1999 | Ying | B62D 55/125 305/115 |
| 5,899,543 A | 5/1999 | Lykken | |
| RE36,284 E | 8/1999 | Kelderman | |
| 5,938,301 A * | 8/1999 | Hostetler | B62D 55/12 305/110 |
| 5,975,226 A | 11/1999 | Matsumoto | |
| 5,988,775 A | 11/1999 | Nordberg | |
| 6,000,766 A | 12/1999 | Takeuchi | |
| 6,006,847 A | 12/1999 | Knight | |
| 6,074,025 A * | 6/2000 | Juncker | B62D 49/0635 305/125 |
| 6,123,399 A | 9/2000 | Snyder | |
| 6,135,220 A | 10/2000 | Gleasman | |
| 6,164,399 A | 12/2000 | Bays | |
| 6,199,646 B1 | 3/2001 | Tani | |
| 6,241,327 B1 | 6/2001 | Gleasman | |
| 6,253,867 B1 | 7/2001 | Lillbacka | |
| 6,260,465 B1 | 7/2001 | Zonak | |
| 6,289,995 B1 | 9/2001 | Fuller | |
| 6,450,280 B1 | 9/2002 | Pepka | |
| 6,485,115 B1 * | 11/2002 | Egle | B62D 55/092 305/117 |
| 6,543,862 B1 | 4/2003 | Kahle | |
| 6,547,345 B2 | 4/2003 | Phely | |
| 6,595,603 B2 | 7/2003 | Rutz | |
| 6,615,939 B1 | 9/2003 | Karales | |
| 6,655,482 B2 | 12/2003 | Simmons | |
| 6,733,093 B2 | 5/2004 | Deland | |
| 6,807,466 B2 | 10/2004 | Strothmann | |
| 6,810,975 B2 | 11/2004 | Nagorcka | |
| 6,840,338 B2 | 1/2005 | Bowers | |
| 6,860,571 B2 | 3/2005 | Scheetz | |
| 6,892,838 B2 | 5/2005 | Bowers | |
| 6,904,986 B2 | 6/2005 | Brazier | |
| 6,904,993 B2 | 6/2005 | Rinck | |
| 6,926,108 B1 | 8/2005 | Polakowski | |
| 6,962,219 B2 | 11/2005 | Hauser | |
| 7,017,688 B2 | 3/2006 | Bowers | |
| 7,131,508 B2 | 11/2006 | Brazier | |
| 7,267,414 B2 | 9/2007 | Scheetz | |
| 7,308,958 B2 | 12/2007 | Tamor | |
| 7,328,760 B2 | 2/2008 | Inaoka | |
| 7,367,637 B2 | 5/2008 | Gleasman | |
| 7,416,266 B2 | 8/2008 | Soucy | |
| 7,464,785 B2 | 12/2008 | Spark | |
| 7,478,688 B2 | 1/2009 | Ki | |
| 7,520,348 B2 | 4/2009 | Bergsten | |
| 7,552,785 B2 | 6/2009 | Tuhy | |
| 7,562,727 B1 | 7/2009 | Hoffart | |
| 7,575,289 B2 * | 8/2009 | Sugihara | B62D 55/08 305/107 |
| 7,597,161 B2 | 10/2009 | Brazier | |
| 7,641,006 B2 | 1/2010 | Scheetz | |
| 7,644,788 B2 | 1/2010 | Scheetz | |
| 7,673,711 B1 | 3/2010 | Berg | |
| 7,677,344 B2 | 3/2010 | Medina | |
| 7,708,092 B2 | 5/2010 | Després | |
| 7,784,884 B2 | 8/2010 | Soucy | |
| 7,914,022 B2 | 3/2011 | Ruebusch | |
| 7,992,659 B2 | 8/2011 | Schaedler | |
| 8,002,365 B2 | 8/2011 | Jacobsen | |
| 8,011,458 B2 | 9/2011 | Hauser | |
| 8,083,242 B2 | 12/2011 | Brazier | |
| 8,104,846 B2 | 1/2012 | Porubcansky | |
| 8,152,248 B2 | 4/2012 | Brazier | |
| 8,430,188 B2 | 4/2013 | Hansen | |
| 8,474,841 B2 | 7/2013 | Ruebusch | |
| 8,573,348 B2 | 11/2013 | Cantemir | |
| 8,579,065 B2 | 11/2013 | Bergsten | |
| 8,630,770 B2 | 1/2014 | Matsumoto | |
| 8,701,801 B2 | 4/2014 | Itou | |
| 8,746,815 B2 * | 6/2014 | Reshad | B62D 55/12 305/135 |
| 8,783,390 B2 | 7/2014 | Maeda | |
| 8,855,861 B2 | 10/2014 | Goebel | |
| 9,008,915 B2 | 4/2015 | Kang | |
| 9,457,854 B2 | 10/2016 | Van Mill | |
| 9,566,858 B2 | 2/2017 | Hicke | |
| 9,586,634 B2 | 3/2017 | Buchanan | |
| 9,688,324 B2 | 6/2017 | Eavenson, Sr. | |
| 9,828,047 B2 | 11/2017 | Eavenson, Sr. | |
| 9,884,662 B2 | 2/2018 | Eavenson, Sr. | |
| 9,902,441 B2 | 2/2018 | Buchanan | |
| 10,155,537 B2 | 12/2018 | Eavenson, Sr. | |
| 10,155,554 B2 | 12/2018 | Eavenson | |
| 10,202,154 B2 | 2/2019 | Eavenson, Sr. | |
| 10,202,155 B2 | 2/2019 | Eavenson, Sr. | |
| 10,427,735 B2 | 10/2019 | Eavenson, Sr. | |
| 2002/0153188 A1 | 10/2002 | Brandt | |
| 2003/0180370 A1 | 9/2003 | Lesniak | |
| 2004/0099451 A1 | 5/2004 | Nagorcka | |
| 2004/0244349 A1 | 12/2004 | Meier | |
| 2005/0035655 A1 | 2/2005 | Beckstrom | |
| 2005/0056468 A1 | 3/2005 | Tucker | |
| 2005/0077984 A1 | 4/2005 | Lee | |
| 2005/0248214 A1 | 11/2005 | Sugihara | |
| 2006/0180370 A1 | 8/2006 | Polakowski | |
| 2009/0278403 A1 | 11/2009 | Canossa | |
| 2009/0308669 A1 | 12/2009 | Vos | |
| 2010/0012399 A1 | 1/2010 | Hansen | |
| 2010/0060075 A1 | 3/2010 | Hansen | |
| 2010/0139994 A1 | 6/2010 | Hansen | |
| 2010/0307843 A1 | 12/2010 | Lawson | |

(56) References Cited

U.S. PATENT DOCUMENTS

| | | | |
|---|---|---|---|
| 2012/0161511 A1* | 6/2012 | Brazier | B62D 55/12 |
| | | | 305/178 |
| 2012/0193979 A1 | 8/2012 | Pard | |
| 2012/0242142 A1 | 9/2012 | Kautsch | |
| 2013/0026819 A1 | 1/2013 | Reshad | |
| 2013/0126196 A1 | 5/2013 | Rosenboom | |
| 2013/0192905 A1 | 8/2013 | Janzen | |
| 2014/0175865 A1 | 6/2014 | Korus | |
| 2014/0288763 A1 | 9/2014 | Bennett | |
| 2014/0305715 A1 | 10/2014 | Makino | |
| 2015/0129329 A1 | 5/2015 | Cox | |
| 2015/0134202 A1 | 5/2015 | Dawson | |
| 2016/0052569 A1 | 2/2016 | Buchanan | |
| 2019/0071140 A1 | 3/2019 | Buchanan | |
| 2019/0111803 A1 | 4/2019 | Ryu | |
| 2019/0168746 A1 | 6/2019 | Roemer | |

FOREIGN PATENT DOCUMENTS

| | | |
|---|---|---|
| DE | 1200144 | 9/1965 |
| DE | 10251637 | 5/2004 |
| EP | 0578504 | 2/1997 |
| EP | 1151910 B1 | 11/2001 |
| JP | 07205852 A | 8/1995 |
| JP | H07205852 | 8/1995 |
| JP | 10129544 | 5/1998 |
| JP | 3937643 | 6/2007 |
| KR | 1020010078749 | 8/2001 |
| WO | 9311022 | 6/1993 |
| WO | 2003059720 | 7/2003 |
| WO | 2005101945 | 11/2005 |
| WO | 2005101945 A2 | 11/2005 |
| WO | 2010046905 | 4/2010 |
| WO | 2014008378 | 1/2014 |
| WO | 2016099770 | 6/2016 |

OTHER PUBLICATIONS

Office Action dated Sep. 23, 2019 for U.S. Appl. No. 16/224,779 (pp. 1-11).
Office Action of Related Chinese Patent Application No. 201811234444.6, dated Sep. 5, 2019, pp. 1-10, English translation.
Office Action of Related Chinese Patent Application No. 201811234444.6, dated Sep. 5, 2019, pp. 1-7.
Notice of Allowance dated Apr. 9, 2020, for U.S. Appl. No. 16/224,779 (pp. 1-8).
Office Action dated Oct. 29, 2019 for U.S. Appl. No. 16/274,203 (pp. 1-7).
Office Action of Related Australian Patent Application No. 2016271322 dated Mar. 2, 2020 (pp. 1-7).
Notice of Allowance dated May 8, 2020 for U.S. Appl. No. 16/274,203 (pp. 1-8).
Notice of Allowance dated Jun. 10, 2020 for U.S. Appl. No. 16/224,779 (pp. 1-5).
EPC Communication pursuant to Article 94(3) EPC for corresponding European Patent Application No. 16729432.1 dated Sep. 21, 2020 (pp. 1-6).
Office Action of Related Canadian Patent Application No. 2,923,229 dated Nov. 12, 2020, pp. 1-3.
Corrected Notice of Allowability dated May 31, 2017 for U.S. Appl. No. 14/484,993.
Corrected Notice of Allowability dated Nov. 8, 2017 for related U.S. Appl. No. 14/484,899; (pp. 1-2).
Final Office Action dated Jul. 12, 2016 for related U.S. Appl. No. 14/412,285.
First Action Interview Pilot Program Pre-Interview Communication dated Jul. 12, 2018 for U.S. Appl. No. 15/890,322; (pp. 1-4).
First Action Interview Pilot Program Pre-Interview Communication dated Jul. 12, 2018 for U.S. Appl. No. 15/890,335; (pp. 1-4).
International Search Report and Written Opinion dated Oct. 11, 2013 for related PCT/US2013/049278.
International Search Report and Written Opinion dated Oct. 7, 2013 for related PCT/US2013/049289.
International Search Report and Written Opinion dated Dec. 5, 2014 for related PCT/US2014/055424.
International Search Report and Written Opinion dated Dec. 7, 2016 for related PCT/US2016/035025.
International Search Report and Written Opinion dated Nov. 5, 2015 for related PCT/US2015/046266.
Notice of Allowance dated Apr. 11, 2018 for related U.S. Appl. No. 15/168,945 (pp. 1-7).
Notice of Allowance dated Aug. 10, 2018 for U.S. Appl. No. 15/381,003 (pp. 1-5).
Notice of Allowance dated Jan. 4, 2017 for related U.S. Appl. No. 14/484,993.
Notice of Allowance dated Jul. 31, 2018 for U.S. Appl. No. 15/168,945 (pp. 1-5).
Notice of Allowance dated Jun. 6, 2017 for U.S. Appl. No. 14/412,285; (pp. 1-8).
Notice of Allowance dated Nov. 20, 2017 for related U.S. Appl. No. 15/450,896; (pp. 1-6).
Notice of Allowance dated Sep. 21, 2017 for related U.S. Appl. No. 14/484,899; (pp. 1-7).
Office Action dated Jan. 29, 2016 for related U.S. Appl. No. 14/412,133.
Office Action dated Nov. 29, 2016 for related U.S. Appl. No. 14/484,899.
Office Action dated Feb. 5, 2018 for related CN App. No. 201480050347.5.
Office Action dated Feb. 8, 2016 for related U.S. Appl. No. 14/412,285.
Office Action dated Apr. 14, 2016 for related U.S. Appl. No. 14/724,172.
Office Action dated May 19, 2017 for related U.S. Appl. No. 15/450,896.
Office Action dated May 27, 2016 for related U.S. Appl. No. 14/484,993.
Office Action dated Jan. 24, 2018 for related U.S. Appl. No. 15/381,003; (pp. 1-13).
Office Action dated Sep. 27, 2017 for related U.S. Appl. No. 15/168,945; (pp. 1-9).
Notice of Allowanace dated Sep. 26, 2018 for U.S. Appl. No. 15/890,322 (pp. 1-8).
Notice of Allowance dated Sep. 25, 2018 for U.S. Appl. No. 15/890,335 (pp. 1-8).
Notice of Allowance dated Jan. 29, 2019 for U.S. Appl. No. 14/412,133 (pp. 1-5).
EPC Communication pursuant to Article 94(3) EPC for corresponding European Patent Application No. 1477226.3 dated Nov. 8, 2018 (pp. 1-3).
EPC Communication pursuant to Article 94(3) EPC for corresponding European Patent Application No. 16729432.1 dated Mar. 19, 2019 (pp. 1-6).
International Search Report and Written Opinion dated Jan. 11, 2019, for related PCT/US2018/049559 (pp. 1-17).
Office Action of Related Chinese Patent Application No. 201480050347.5, dated Apr. 1, 2017, pp. 1-11.
Corrected Notice of Allowability dated Aug. 6, 2018 for U.S. Appl. No. 15/168,945 (pp. 1-4).
Office Action dated Mar. 10, 2017 for related U.S. Appl. No. 15/381,003.
Notice of Allowance dated May 28, 2019 for U.S. Appl. No. 14/412,133 (pp. 1-6).
Office Action of Related Canadian Patent Application No. 2,878,283 dated May 30, 2019, pp. 1-3.
Office Action of Related Canadian Patent Application No. 2,878,285 dated Apr. 30, 2019, pp. 1-3.
Communication under Rule 71(3) EPC for corresponding European Patent Application No. 15763446.0 dated Jun. 21, 2019 (pp. 1-7).
Examination Report for corresponding Australian Patent Application No. 2018330078, dated Feb. 8, 2021, 5 pages long.

(56) References Cited

OTHER PUBLICATIONS

Office Action dated Apr. 21, 2021 for U.S. Appl. No. 16/121,622 (pp. 1-10).

* cited by examiner

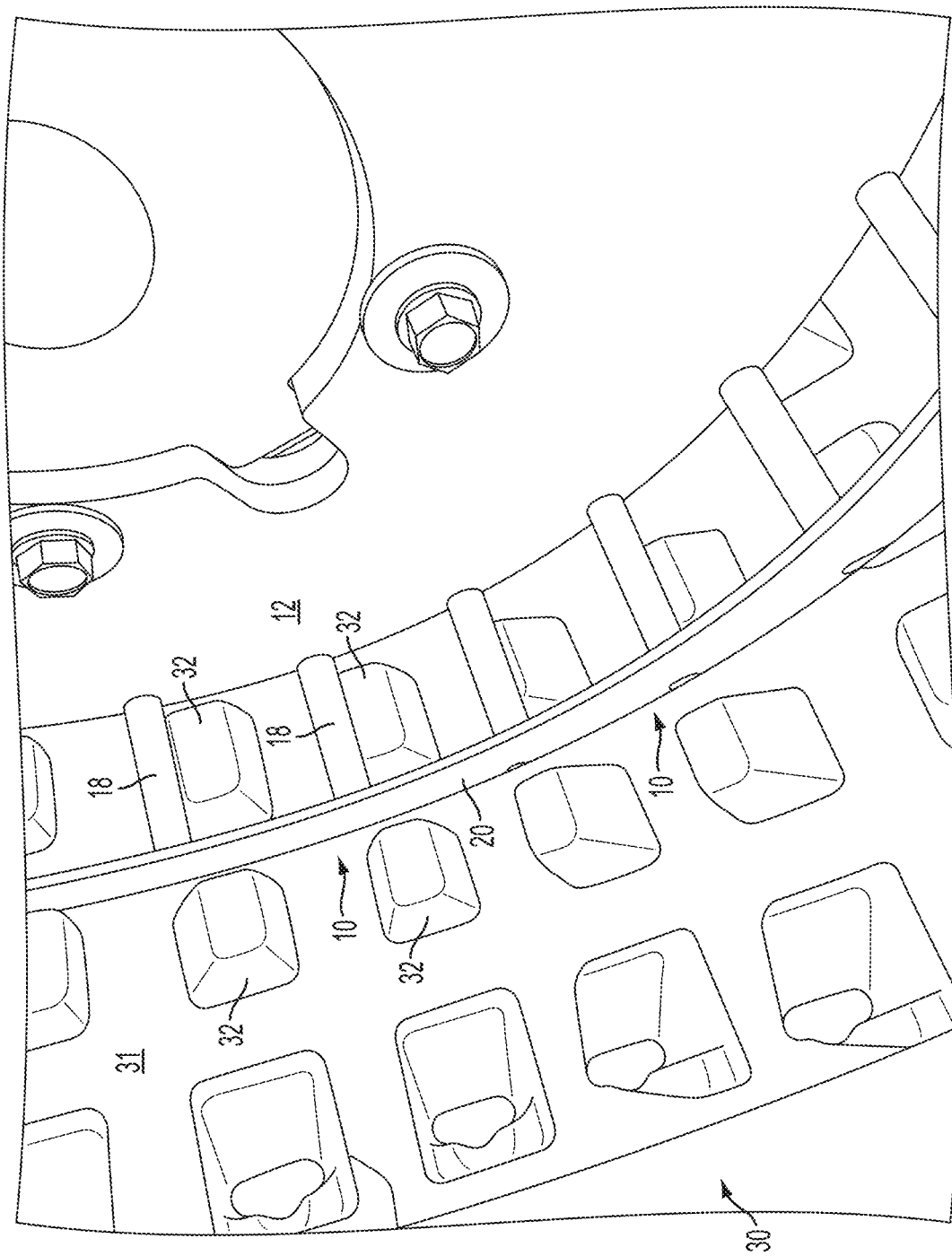

DRIVE SPROCKET FOR A TRACKED VEHICLE

CROSS-REFERENCE TO RELATED APPLICATIONS

This application is a continuation of U.S. patent application Ser. No. 15/381,003 filed Dec. 15, 2016, which is a continuation of Ser. No. 14/484,993 filed Sep. 12, 2014, which claims benefit of U.S. Provisional Patent Application Ser. No. 61/877,584, filed Sep. 13, 2013, and entitled "DRIVE SPROCKET FOR A TRACKED VEHICLE", which are herein incorporated by reference in their entireties.

FIELD OF THE INVENTION

The present invention is directed to a drive sprocket, and more particularly, a drive sprocket for a tracked vehicle having a suspension.

BACKGROUND OF THE INVENTION

Track drive machines typically include those with metal or composite cleats that are connected together to form continuous loops and those constructed of reinforced polymer/rubber materials that are manufactured in endless loops.

Tracked vehicles are typically designed so as to produce ground pressures lower than that of wheeled vehicles. Heavy machines are typically below 15 $lb/in^2$, but lightweight machines are ranging as low as 1 to 3 $lb/in^2$. The stiffness of the track is selected to minimize flexing between the bogie wheels. The track is therefore kept substantially straight between the bogie wheels, idlers, and the drive sprocket to increase the efficiency associated with transference of power to the tracks and losses due to misalignment. Track tension, especially for non-metallic endless-loop configurations, must be maintained within prescribed parameters in order to prevent buckling in slack sections.

Drive sprockets are sometimes positioned above the ground to reduce contamination, reduce complexity in the design while effectively transmitting power to the tracks. Positioning the drive sprockets above ground also helps to prevent derailing of the track. Tracks are generally held in a constant state of tension on the drive sprocket and the roller, and this also helps to prevent derailment.

These offerings have limitations in performance in regard to lateral derailment of tracks, drive lug skipping (ratcheting), and backlash impacts from sprocket engagement to drive lug during traction direction load reversals.

A need therefore exists for a drive sprocket for a tracked vehicle in which the drive sprocket maintains closer engagement with guide lugs on track. A need also exists for a drive sprocket for a tracked vehicle that reduces the wear and increases the longevity of the guide lugs and adjacent lugs on the track.

BRIEF SUMMARY OF THE INVENTION

In one aspect of the invention, a drive sprocket for driving a track of a tracked vehicle comprises: a pair of spaced-apart inner rings, wherein the inner rings are oriented in a substantially spaced-apart manner, each of the inner rings having an outer peripheral edge; a plurality of rods attached to the inner rings adjacent to the outer peripheral edge thereof; and a pair of guide rings fixedly attached to the rods, wherein each of the guide rings is attached adjacent to an opposing end of the rods, the guide rings being oriented substantially parallel to each other and the inner rings.

In another aspect of the drive sprocket, a spacer is positioned between the inner rings, the spacer being fixedly attached to the inner rings.

In another aspect of the drive sprocket, an adapter is attached to an outwardly-directed surface of one of the pair of inner rings.

In another aspect of the drive sprocket, a slide ring is attached to an outwardly-directed surface of each of the guide rings.

In another aspect of the drive sprocket, an outwardly-directed surface of each of the guide rings is coated with a friction-reducing material.

In another aspect of the drive sprocket, each of the plurality of rods is spaced-apart from adjacent rods.

In another aspect of the drive sprocket, the plurality of rods form a plurality of clusters, wherein each of the clusters is formed of a pair of the rods and each of the cluster is spaced-apart from adjacent clusters about the peripheral edge of the inner rings.

In another aspect of the drive sprocket, the rods are cylindrically shaped having a circumferential surface.

In another aspect of the drive sprocket, a portion of the circumferential surface of the rods extend radially outward away from the outer peripheral surface of the inner rings relative to a rotational axis of the drive sprocket.

In another aspect of the drive sprocket, a portion of the circumferential surface of the rods extend radially outward away from the outer peripheral surface of the guide rings relative to a rotational axis of the drive sprocket.

In another aspect of the drive sprocket, a portion of the circumferential surface of the rods extend radially outward away from the outer peripheral surface of the inner rings relative to a rotational axis of the drive sprocket, and a portion of the circumferential surface of the rods extend radially outward away from the outer peripheral surface of the guide rings relative to a rotational axis of the drive sprocket.

In yet another aspect of the invention, a drive sprocket for driving a track of a tracked vehicle comprises: an interior ring, an exterior ring, and an intermediate ring situated between the interior ring and the exterior ring; the interior ring, the exterior ring, and the intermediate ring are oriented in a substantially spaced-apart manner and are parallel with one another, each of the rings having an outer peripheral surface; and a plurality of rods attached to the rings adjacent to the outer peripheral surface thereof.

In another aspect of the invention, the interior ring has a substantially "U" or "J" shape.

In another aspect of the invention, the an inner guide ring, an outer guide ring, and a base ring of the interior ring form the substantially "U" or "J" shape of the interior ring. The base ring is located between the inner guide ring and the outer guide ring.

In another aspect of the invention, the base ring, the inner guide ring, and a first portion of the outer guide ring of interior ring form the substantially "U" shape of the interior ring.

In another aspect of the invention, the exterior ring has a substantially "U" or "J" shape.

In another aspect of the invention, an inner guide ring, an outer guide ring, and a base ring of the exterior ring form the substantially "U" or "J" shape of the exterior ring. The base ring is located between the inner guide ring and the outer guide ring of the exterior ring.

In another aspect of the invention, the base ring, the outer guide ring, and a first portion of the inner guide ring of the exterior ring form the substantially "U" shape of the exterior ring.

In another aspect of the invention, the intermediate ring has a substantially "U" or "J" shape.

In another aspect of the invention, an inner guide ring, an outer guide ring, and a base ring of the intermediate ring form the substantially "U" or "J" shape of the intermediate ring. The base ring is located between the inner guide ring and the outer guide ring of the intermediate ring.

In another aspect of the invention, the base ring, the inner guide ring, and a first portion of the outer guide ring of the intermediate ring form the substantially "U" shape of the intermediate ring.

In another aspect of the invention, the "U" or "J" shape of the interior ring is configured to substantially fill the space between an interior guide lug and an interior drive lug arranged in an annular pattern on an inside surface of a track.

In another aspect of the invention, the "U" or "J" shape of the intermediate ring is configured to substantially fill the space between an exterior drive lug and an interior drive lug arranged in an annular pattern on an inside surface of a track.

In another aspect of the invention, the "U" or "J" shape of the exterior ring is configured to substantially fill the space between an exterior guide lug and an exterior drive lug arranged in an annular pattern on an inside surface of a track.

In another aspect of the invention, the base ring of the interior ring is further comprised of a flat outer peripheral surface located between the rods and the inner guide ring and the outer guide ring of the interior ring.

In another aspect of the invention, the base ring of the exterior ring is further comprised of a flat outer peripheral surface located between the rods and the inner guide ring and the outer guide ring of the exterior ring.

In another aspect of the invention, the base ring of the intermediate ring is further comprised of a flat outer peripheral surface located between the rods and the inner guide ring and the outer guide ring of the intermediate ring.

In another aspect of the invention, each of the plurality of rods is spaced-apart from adjacent rods.

In another aspect of the invention, the plurality of rods form a plurality of clusters, wherein each of the clusters is formed of a pair of the rods and each of the clusters is spaced apart from adjacent clusters about the peripheral edge of the inner rings.

In another aspect of the invention, the rods are cylindrically shaped having a circumferential surface.

In another aspect of the invention, a portion of the circumferential surface of the rods extends radially outward away from the outer peripheral surface of the interior ring relative to a rotational axis of the drive sprocket.

In another aspect of the invention, a portion of the circumferential surface of the rods extends radially outward away from the outer peripheral surface of the exterior ring relative to a rotational axis of the drive sprocket.

In another aspect of the invention, a portion of the circumferential surface of the rods extends radially outward away from the outer peripheral surface of the intermediate ring relative to a rotational axis of the drive sprocket.

In another aspect of the invention, an adapter is fixed to an outer guide ring of the interior ring, wherein the adapter is configured to be directed toward a tracked vehicle when the drive sprocket is mounted on the tracked vehicle.

In another aspect of the invention, a spoke assembly is fixed to the outer guide ring of the interior ring; the spoke assembly is configured to be directed away from the tracked vehicle when the drive sprocket is mounted on the tracked vehicle; the spoke assembly ring has a plurality of spokes projecting toward the radial periphery of the drive sprocket; the spokes form an acute angle with respect to the outer guide ring.

In another aspect of the invention, each of the spokes has a ring end, a distal end, and an intermediate position located between the ring end and the distal end; the exterior ring is fixed to the distal end of the spokes and the intermediate ring is fixed to the spokes at the intermediate position.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which:

FIGS. 3A-B are perspective views of an embodiment of a drive sprocket on a tracked vehicle.

Figure 1A:
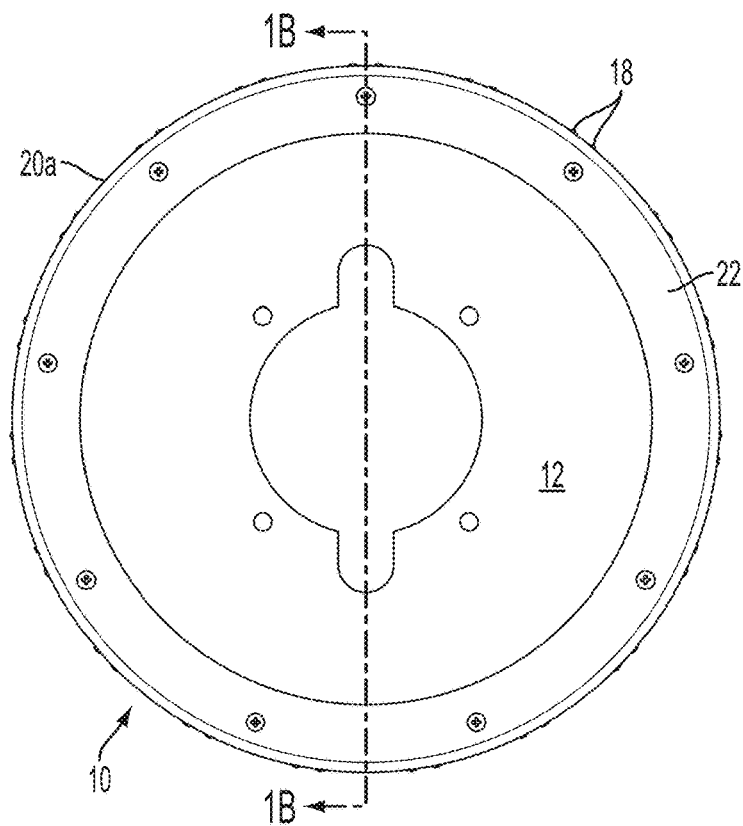
FIG. 1A is an end view of a first exemplary embodiment of a drive sprocket.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

The proposal provides for metallic or composite material sprocket with a central hub with radial extensions (such as discs or spokes) to connect with teeth equally spaced in an annual arrangement. The teeth are spaced to engage the track drive lugs near their tooth roots and to match the track pitch length in a neutral or a slightly under-pitch condition.

The drive sprocket is provided with rod-shaped teeth that engage the traction drive lugs of the tracks close to the traction drive lug pitch line so as to reduce bending moments and stress on the drive lugs. The sprocket teeth do not appreciably "scrub" the areas between the drive lugs during traction drive load force reversals such as during machine acceleration and deceleration and turning maneuvers. One embodiment shown includes two (or more) rods to further minimize the backlash. This reduction in backlash also reduces the propensity for track drive lug skipping. In other embodiments, only one rod is present at each drive rod-tooth location.

The drive sprocket includes a pair of guide rings that attach to the drive rod-teeth, and they laterally engage guide lugs during turning maneuvers to prevent track derailment. These rings greatly strengthen the drive rod-teeth and help to increase the contact areas of the teeth while also reducing track deformation (flexing of the rods without the ring supports allow a crowning effect of the tracks at the sprockets). In one embodiment, these rings are equipped with low friction materials to reduce scrub friction with the guide lugs. In other embodiments, a low friction material is not present on the guide rings.

The following features are incorporated:
    A sprocket incorporating a central drive hub, radial extensions to connect with teeth, single rod-shaped teeth annularly spaced at the pitch-length of the track, and rings attached to the teeth
    Same as above but with multiple rods at each tooth location
    Same as above, but with low-friction materials coated onto or attached to the rings
    Same as above but with the teeth annularly spaced at less than the pitch-length of the track, up to 1% under-pitch In the embodiment illustrated in FIGS. 1A-C, the drive sprocket 10 includes a pair of substantially circular inner rings 12. A spacer 14 is positioned between the pair of inner rings 12 to allow the inner rings 12 to be spaced apart. The thickness of the spacer 14 is between about 0.10 inches and about 3.0 inches. The spaced-apart inner rings 12 provide lateral stiffness to the drive sprocket 10, particularly with respect to the lateral forces experienced during a turn of the vehicle. The spacer 14 is sandwiched between the inner rings 12. An adapter 16 is positioned adjacent to the outwardmost inner ring 12 relative to the vehicle when the drive sprocket 10 is operatively connected to the vehicle. The adapter 16 is configured to engage a drive shaft or other rotatable shaft that operatively transfers rotation from the engine to the drive sprocket 10. When the drive sprocket 10 is installed onto the drive shaft, the adapter 16 is directed away from the vehicle.

In an embodiment, the inner rings 12 and the spacer 14 can be formed as a single member having an equivalent thickness. The spacer 14 allows the inner rings 12 to provide the structural integrity to the rods 18 while reducing the weight of the drive sprocket 10. In a similar manner, the adapter 16 can also be formed as having a diameter that is substantially the same as the inner rings 12. The spacer 14 and adapter 16 are attached to the inner rings 12 to allow the drive sprocket 10 to be attached to the drive shaft from an engine while transferring the rotational force to the inner rings 12. In another embodiment, the inner rings 12, spacer 14, and adapter 16 all include a common aperture shaped to receive the drive shaft (not shown) that provides the rotational power to the drive sprocket 10.

Figure 1B:
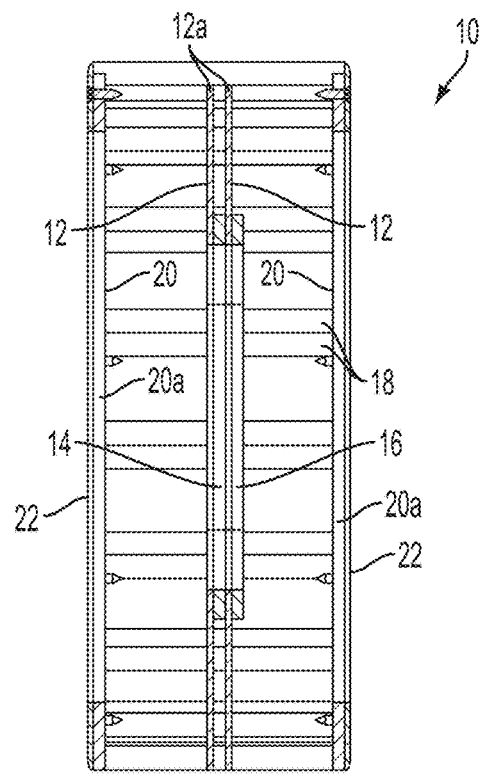
FIG. 1B is a view of a first exemplary embodiment of a drive sprocket taken along line 1B of FIG. 1A.
Figure 1C:
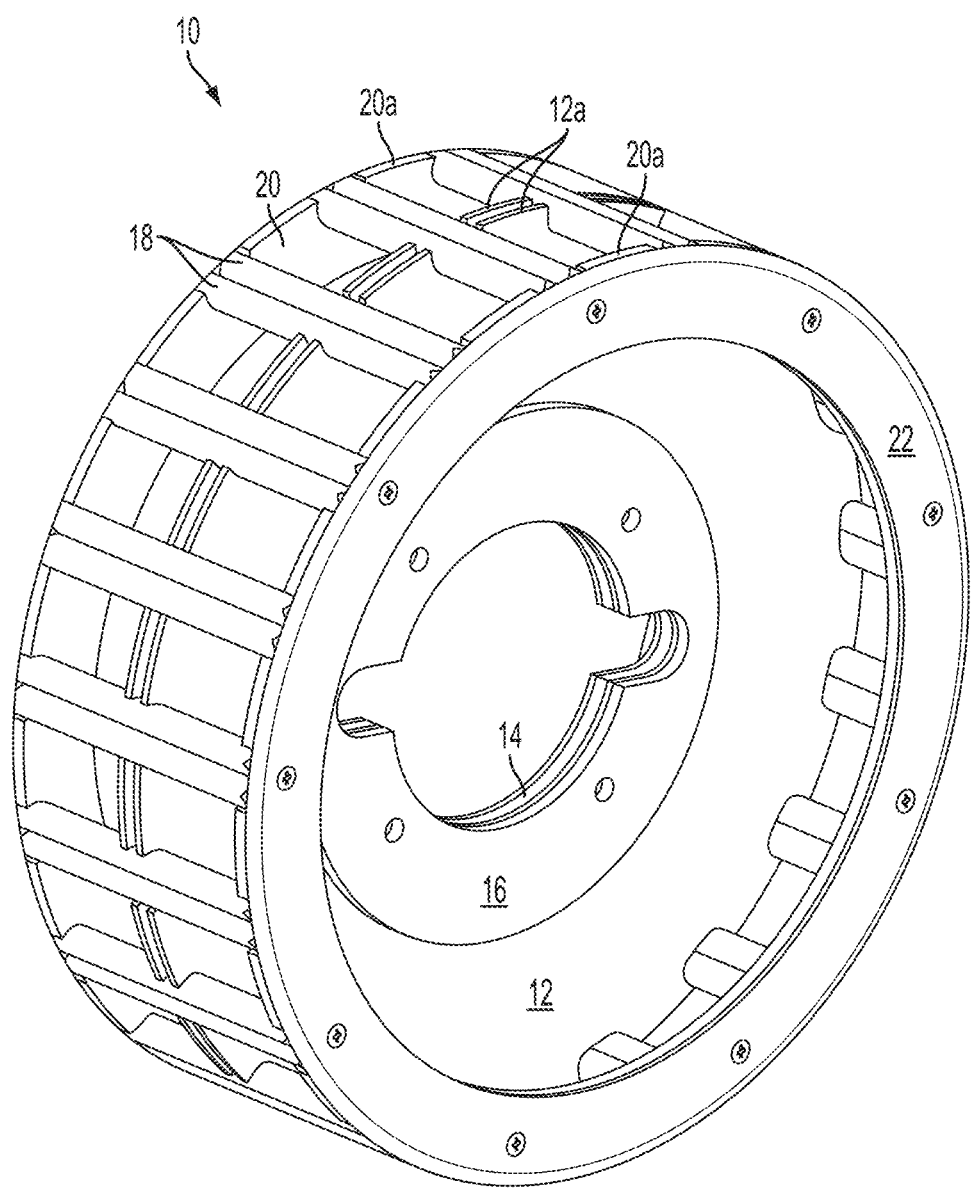
FIG. 1C is a perspective view of a first exemplary embodiment of a drive sprocket.

A plurality of rods 18 are positioned about the radial periphery of the spaced-apart inner rings 12, as shown in FIGS. 1A-C. The rods 18 are connected to the inner rings 12 such that a portion of each rod 18 extends laterally away from each of the inner rings 12 in a substantially parallel manner relative to the rotational axis of the drive sprocket 10. In an embodiment, a pair of rods 18 are positioned immediately adjacent to each other to form a cluster, and each cluster is spaced apart about the periphery of the inner rings 12. In another embodiment, each rod 18 is spaced apart from each adjacent rod about the periphery of the inner rings 12. In an embodiment, the rods 18 are cylindrical, having a circular cross-sectional shape. It should be understood by one of ordinary skill in the art that the cross-sectional shape of the rods 18 can be any shape such as circular, square, triangular, or the like. The rods 18 are configured to engage the guide lugs positioned on the inner surface of a track. In an embodiment, as is shown in FIG. 1A, a portion of the circumferential surface of the rods 18 extend radially outward away from the outer peripheral surface 12a of the inner rings 12 relative to the rotational axis of the drive sprocket 10. As such, the rods 18 extend beyond the inner rings 12 to ensure engagement with the base of each guide lug of the track. The rods 18 are oriented substantially perpendicular to the flat inner rings 12 to which they are attached.

A pair of guide rings 20 are attached to the rods 18, wherein each guide ring 20 is attached to adjacent ends of the rods 18 in a spaced-apart manner, as shown in FIGS. 1A-C. The guide rings 20 are single-piece annular members oriented in a substantially parallel manner on opposing sides of the spacer 14 and adapter 16. The outwardly-directed surface of the guide rings 20 are positioned outwardly from the rods 18. Similar to the inner rings 12, the rods 18 extend radially outward relative to the outer peripheral surface 20a of the guide rings 20.

In an embodiment, the outwardly directed surfaces of the guide rings 20 are coated with a reduced-friction material such as Teflon®, silicon, or the like. The reduced-friction material can be a spray-on type, adhesive type, or other manner of coating the guide rings 20. The reduced-friction material prevents rubbing and wear against adjacent lugs on the track when operated during dry conditions. However, if the vehicle is being used in a wet environment or on grass which may act as a lubricant, the reduced-friction material is optional. In another embodiment, a slide ring 22 which has low friction, wherein the outer peripheral edge of the slide ring 22 is rounded to reduce the impact against the adjacent lugs of the track. The slide ring 22 is formed of nylon 6/6 or other reduced-friction material. The slide ring 22 is formed as a continuous, single-piece annular member having substantially the same size and shape as the guide ring 20 to which it is attached. The slide ring 22 is attached to the guide ring 20 by way of a plurality of screws, but any other fastening mechanism can be used to attach each slide ring 22 to an outwardly-directed surface of a corresponding guide ring 20.

The inner rings 12 and the guide rings 20 can be formed of aluminum, steel, or any other material sufficient to withstand the stresses experienced during driving a tracked vehicle, particularly the lateral stresses experienced during a turn.

Figure 2A:
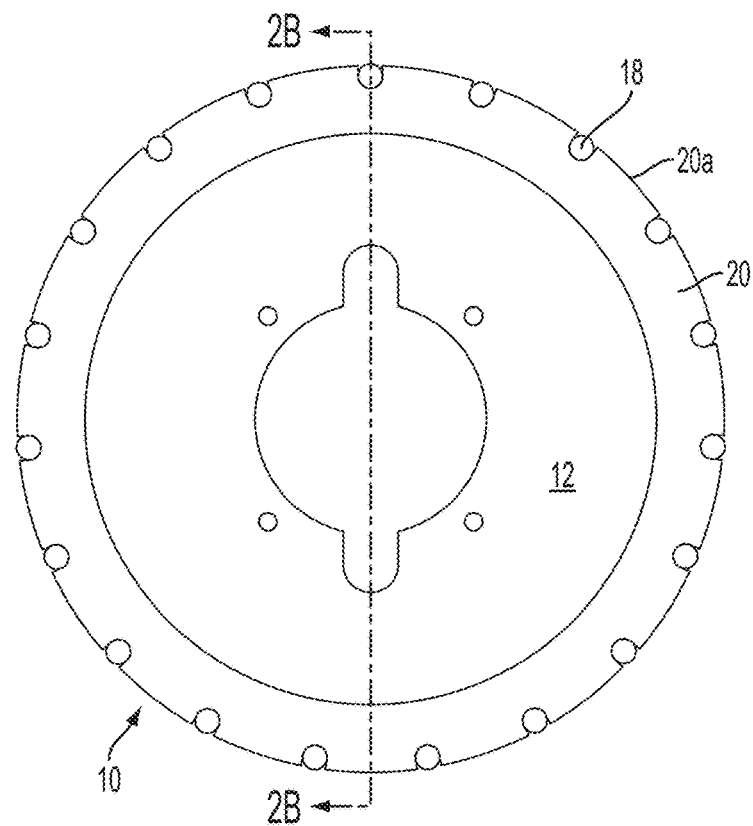
FIG. 2A is an end view of a second exemplary embodiment of a drive sprocket.
Figure 2B:
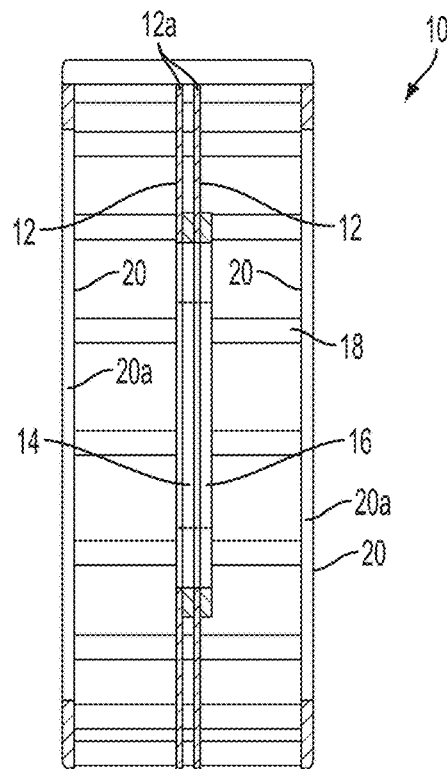
FIG. 2B is a view a second exemplary embodiment of a drive sprocket taken along line 2B of FIG. 2A.
Figure 2C:
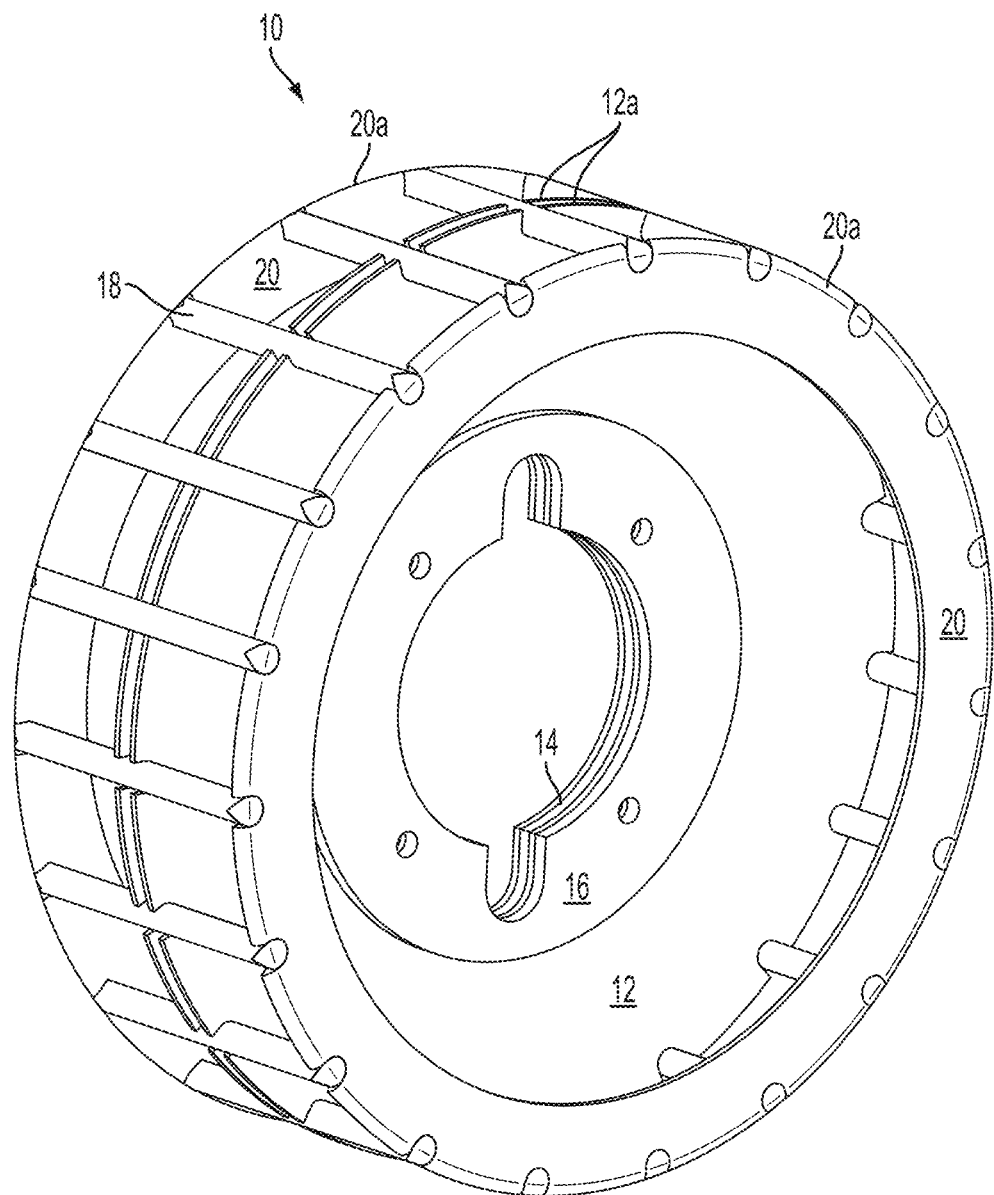
FIG. 2C is a perspective view of a second exemplary embodiment of a drive sprocket.

In the embodiment illustrated in FIGS. 2A-C, the drive sprocket 10 includes a pair of substantially circular inner rings 12. A spacer 14 is positioned between the pair of inner rings 12 to allow the inner rings 12 to be spaced apart. The thickness of the spacer 14 is between about 0.10 inches and about 3.0 inches. The spaced-apart inner rings 12 provide lateral stiffness to the drive sprocket 10, particularly with respect to the lateral forces experienced during a turn of the vehicle. The spacer 14 is sandwiched between the inner rings 12. An adapter 16 is positioned adjacent to the outwardmost inner ring 12 relative to the vehicle when the drive sprocket 10 is operatively connected to the vehicle. The adapter 16 is configured to engage a drive shaft or other rotatable shaft that operatively transfers rotation from the engine to the drive sprocket 10. When the drive sprocket 10 is installed onto the drive shaft, the adapter 16 is directed away from the vehicle.

In an embodiment, the inner rings 12 and the spacer 14 can be formed as a single member having an equivalent thickness. The spacer 14 allows the inner rings 12 to provide the structural integrity to the rods 18 while reducing the weight of the drive sprocket 10. In a similar manner, the adapter 16 can also be formed as having a diameter that is substantially the same as the inner rings 12. The spacer 14 and adapter 16 are attached to the inner rings 12 to allow the drive sprocket 10 to be attached to the drive shaft from an engine while transferring the rotational force to the inner rings 12. In another embodiment, the inner rings 12, spacer 14, and adapter 16 all include a common aperture shaped to receive the drive shaft (not shown) that provides the rotational power to the drive sprocket 10.

A plurality of rods 18 are positioned about the radial periphery of the spaced-apart inner rings 12, as shown in FIGS. 2A-C. The rods 18 are connected to the inner rings 12 such that a portion of each rod 18 extends laterally away from each of the inner rings 12 in a substantially parallel manner relative to the rotational axis of the drive sprocket 10. In an embodiment, each rod 18 is spaced apart from each adjacent rod about the periphery of the inner rings 12. In an embodiment, the rods 18 are cylindrical, having a circular cross-sectional shape. It should be understood by one of ordinary skill in the art that the cross-sectional shape of the rods 18 can be any shape such as circular, square, triangular, or the like. The rods 18 are configured to engage the guide lugs positioned on the inner surface of a track. In an embodiment, a portion of the circumferential surface of the rods 18 extend radially outward away from the outer peripheral surface 12a of the inner rings 12 relative to the rotational axis of the drive sprocket 10. As such, the rods 18 extend beyond the inner rings 12 to ensure engagement with the base of each guide lug of the track. The rods 18 are oriented substantially perpendicular to the flat inner rings 12 to which they are attached.

A pair of guide rings 20 are attached to the rods 18, wherein each guide ring 20 is attached to adjacent ends of the rods 18 in a spaced-apart manner, as shown in FIGS. 2A-C. The guide rings 20 are single-piece annular members oriented in a substantially parallel manner on opposing sides of the spacer 14 and adapter 16. The outwardly-directed surface of the guide rings 20 are positioned outwardly from the rods 18. Similar to the inner rings 12, the rods 18 extend radially outward relative to the outer peripheral surface 20a of the guide rings 20.

In some embodiments, the outwardly directed surfaces of the guide rings 20 are not coated with a reduced-friction material, nor are guide rings 20 equipped with slide ring 22. Therefore, the reduced friction material and slide ring 22 are optional for guide rings 20.

The inner rings 12 and the guide rings 20 can be formed of aluminum, steel, or any other material sufficient to withstand the stresses experienced during driving a tracked vehicle, particularly the lateral stresses experienced during a turn.

Figure 3A:
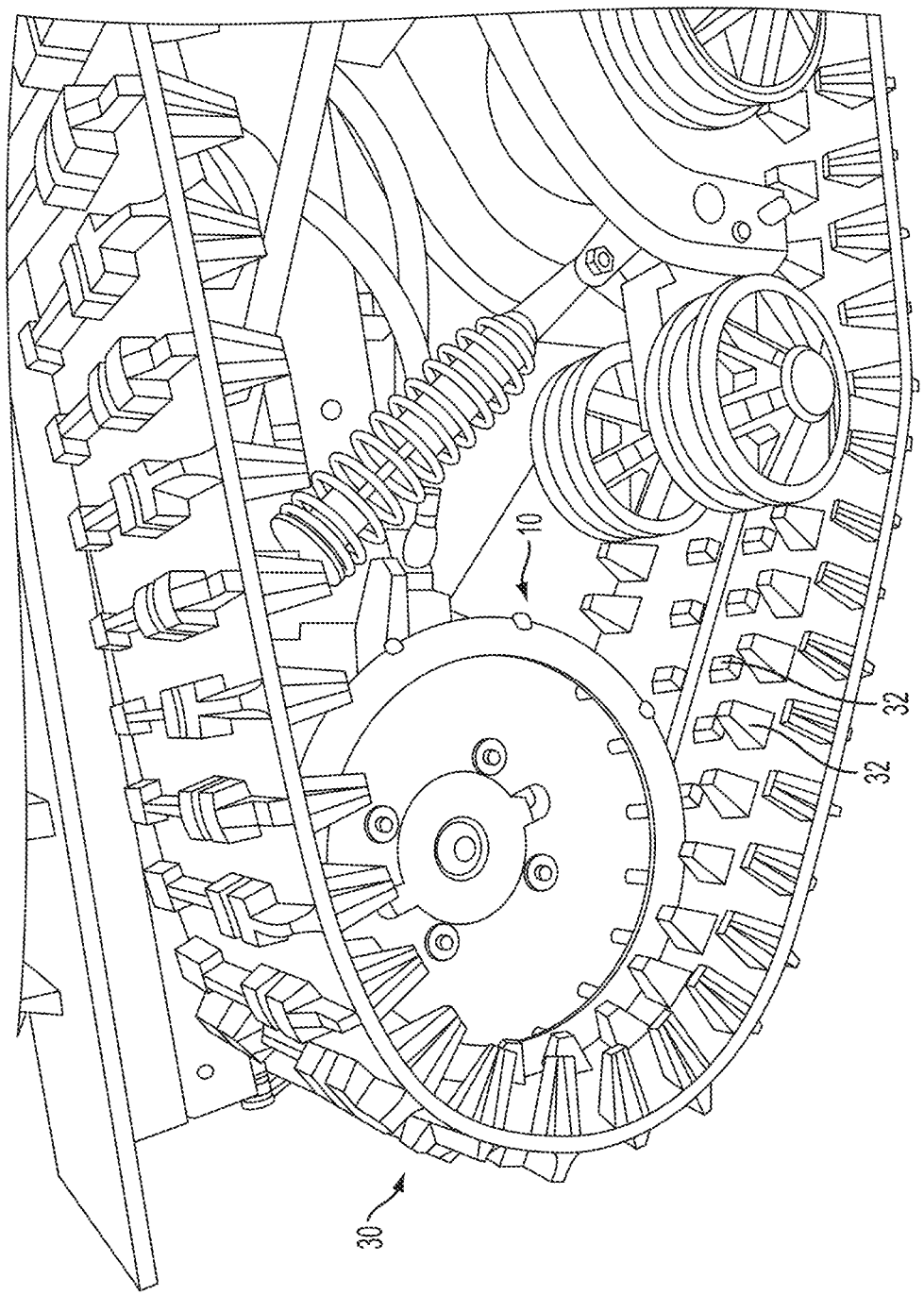

FIGS. 3A-B show an embodiment of drive sprocket 10 on a tracked vehicle. As was stated above, each track 30 of tracked vehicle has a plurality of drive lugs 32 arranged in an annular pattern on the inside surface 31 of track 30. Accordingly, in operation, rods 18 of drive sprocket 10 engage a drive lug 32 where drive lug 32 meets inside surface 31 of track 30, thereby rods 18 engage the traction drive lugs 32 of tracks 30 close to the traction drive lug pitch line, so as to reduce bending moments and stress on the drive lugs 32.

Further, the proposal provides for embodiments of a drive sprocket constructed of metallic or composite material with u-shaped rings to connect with rods equally spaced in an annual arrangement. The rods are spaced to engage the track drive lugs near their tooth roots to match the track pitch length in a neutral or a slightly under pitch condition.

The following features are incorporated:
  Address off-center mounting of said drive sprocket to the drive hub
  Rings with radius corners (U-shape) to improve reaction to guide & drive lugs
    U-shape with radius corners guides lugs into self-alignment
    U-shape adds additional vertical guide rings
    U-shape with "flat" areas between the guide rings provide additional support to the track and structural strength to the drive sprocket In the embodiment illustrated in FIGS. 4-5, the drive sprocket 10 includes an interior ring 40, exterior ring 50, and an intermediate ring 60 located between said interior ring 40 and exterior ring 50. Said interior ring 40, exterior ring 50, and intermediate ring 60 are spaced apart and centered about the rotational axis of the drive sprocket 10. Interior ring 40 is the inner most ring relative to the tracked vehicle when drive sprocket 10 is installed onto the drive shaft of the tracked vehicle. Exterior ring 50 is the outer most ring relative to the tracked vehicle when drive sprocket 10 is installed onto the drive shaft of the tracked vehicle.

Interior ring 40 has an inner guide ring 41, an outer guide ring 43, and a base ring 47. Inner guide ring 41 and outer guide ring 43 are vertically oriented rings relative to the rotational axis of the drive sprocket 10. Further, inner guide ring 41 and outer guide ring 43 are substantially parallel.

Inner guide ring 41 is the inner most ring of interior ring 40 and outer guide ring 43 is the outer most ring of interior ring 40 relative to the tracked vehicle when drive sprocket 10 is installed onto the drive shaft (not shown) of the tracked vehicle. Base ring 47 is located between interior ring 40 and outer guide ring 43.

Base ring 47 is a ring having a horizontally oriented width relative to the rotational axis of the drive sprocket 10. Base ring 47 extends in a substantially parallel manner relative to the rotational axis of sprocket 10, thereby bridging between inner guide ring 41 and outer guide ring 43. Further, inner guide ring 41 and outer guide ring 43 are substantially perpendicular to base ring 47. A base portion 41c of inner guide ring 41 is connected to first side 47a of base ring 47. A base portion 43c of outer guide ring 43 is connected to second side 47b of base ring 47. The transitions between inner guide ring 41 and base ring 47, and outer guide ring 43 and base ring 47 are radius corners.

An adapter 16 is fixed to the inside face 43e of outer guide ring 43 and directed toward the tracked vehicle. Adapter 16 and outer guide ring 43 share a common center hole 44 and lug holes 45. Adapter 16 and outer guide ring 43 are centered about the rotational axis of the drive sprocket 10. Adapter 16 and outer guide ring 43 are configured to engage a drive shaft or other rotatable shaft that operatively transfers rotation from the engine to the drive sprocket 10.

In some embodiments, outer guide ring 43 has a plurality of lightening apertures 46, which reduce the weight of outer guide ring 43, while providing structural integrity for drive sprocket 10. In some embodiments, adapter 16 can be formed as having a diameter substantially the same as outer guide ring 43. In some embodiments, adapter 16 has lightening apertures 46.

As can be seen, inner guide ring 41, outer guide ring 43, and base ring 47 of interior ring 40 form substantially a "J" shape, or a "U" shape with an elongated leg on one side of the "U". Stated alternatively, inner guide ring 41, outer guide ring 43, and base ring 47 form the cross-section of interior ring 40, which in some embodiments is substantially a "J" shape or a "U" shape with an elongated leg on one side of the "U".

Further, outer guide ring 43 has a first portion 43a and a second portion 43b. The first portion 43a extends from base portion 43c toward the center of outer guide ring 43 for a vertical distance "A", which is substantially equal to the distance between the base portion 41c and interior edge 42 of inner guide ring 41. Stated alternatively, the height of the first portion 43a of outer guide ring 43 is substantially equal to the height of inner guide ring 41. Second portion 43b extends from center hole 44 to first portion 43a. Accordingly, as can be seen, in some embodiments, first portion 43a of outer guide ring 43, base ring 47, and inner guide ring 41 of interior ring 40 form substantially a "U" shape. Stated alternatively, in some embodiments, first portion 43a of outer guide ring 43, base ring 47, and inner guide ring 41 form substantially a "U" shape cross-section of interior ring 40.

In some embodiments, outer guide ring 43 and inner guide ring 41 of interior ring 40 are substantially the same height, thereby outer guide ring 43, inner guide ring 41, and base ring 47 form substantially a "U" shape. Stated alternatively, in some embodiments, outer guide ring 43 and inner guide ring 41 of interior ring 40 are substantially the same height, thereby, in such embodiments, outer guide ring 43, inner guide ring 41, and base ring 47 form substantially a "U" shape cross-section of interior ring 40.

A spoke assembly 70 is fixed to the outside face 43d of outer guide ring 43 and directed away from the tracked vehicle when drive sprocket is installed onto the drive shaft. Spoke assembly 70 has a spoke assembly ring 71 fixed to outer guide ring 43. Spoke assembly 70 and spoke assembly ring 71 are centered about the rotational axis of the drive sprocket 10.

Spoke assembly ring 71 has a plurality of spokes 72 projecting toward the radial periphery of drive sprocket 10. Spokes 72 form an acute angle with respect to outer guide ring 43. Each spoke 72 has a ring end 73 located adjacent to spoke assembly ring 71 and a distal end 75 located opposite ring end 73. Distal end 75 of spoke 72 has a tab 76. Slot 74 is located along spoke 72 between distal end 75 and ring end 73.

Turning now to exterior ring 50, exterior ring 50 has an inner guide ring 51, an outer guide ring 55, and a base ring 57. Inner guide ring 51 and outer guide ring 55 are vertically oriented rings relative to the rotational axis of the drive sprocket 10. Further, inner guide ring 51 and outer guide ring 55 are substantially parallel.

Inner guide ring 51 is the inner most ring of exterior ring 50 and outer guide ring 55 is the outer most ring of exterior ring 50 relative to the tracked vehicle when drive sprocket 10 is installed onto the drive shaft of the tracked vehicle. Base ring 57 is located between inner guide ring 51 and outer guide ring 55.

Base ring 57 is a ring having a horizontally oriented width relative to the rotational axis of the drive sprocket 10. Base ring 57 extends in a substantially parallel manner relative to the rotational axis of sprocket 10, thereby bridging between inner guide ring 51 and outer guide ring 55. Further, inner guide ring 51 and outer guide ring 55 are oriented perpendicular to base ring 57. A base portion 51c of inner guide ring 51 is connected to first side 57a base ring 57. A base portion 55c of outer guide ring 55 is connected to second side 57b of base ring 57. The transitions between inner guide ring 51 and base ring 57, and outer guide ring 55 and base ring 57 are radius corners.

Inner guide ring 51 has an interior edge 52. Inner guide ring 51 has recesses 53 positioned radially about interior edge 52. The radial positions of recesses 53 correspond to the radial positions of the distal end 75 of spokes 72 with tab 76, such that each tab 76 is fitted into a corresponding recess 53. Accordingly, as can be seen, distal end 75 of spokes 72 is attached to inner guide ring 51 at interior edge 52.

As can be seen, inner guide ring 51, outer guide ring 55, and base ring 57 of exterior ring 50 form substantially a "J" shape, or a "U" shape with an elongated leg on one side of the "U". Stated alternatively, inner guide ring 51, outer guide ring 55, and base ring 57 form the cross-section of exterior ring 50, which in some embodiments is substantially a "J" shape, or a "U" shape with an elongated leg on one side of the "U".

Further, inner guide ring 51 has a first portion 51a and a second portion 51b. The first portion 51a extends from base portion 51c toward the center of inner guide ring 51 for a vertical distance "B", which is substantially equal to the distance between the base portion 55c and interior edge 56 of outer guide ring 55. Stated alternatively, the height of the first portion 51a of inner guide ring 51 is substantially equal to the height of outer guide ring 55. Second portion 51b extends from interior edge 52 to first portion 43a. Accordingly, as can be seen, in some embodiments, first portion 51a of inner guide ring 51, base ring 57, and outer guide ring 55 of exterior ring 50 form substantially a "U" shape. Stated alternatively, first portion 51a of inner guide ring 51, base ring 57, and outer guide ring 55 form substantially a "U" shape cross section of exterior ring 50.

In some embodiments, outer guide ring 55 and inner guide ring 51 of exterior ring 50 are substantially the same height, thereby outer guide ring 55, inner guide ring 51, and base ring 57 form substantially a "U" shape. Stated alternatively, in some embodiments, outer guide ring 55 and inner guide ring 51 of exterior ring 50 are substantially the same height, thereby, in such embodiments, outer guide ring 55, inner guide ring 51, and base ring 57 form substantially a "U" shape cross-section of exterior ring 50.

Turning now to intermediate ring 60, intermediate ring 60 has an inner guide ring 61, an outer guide ring 63, and a base ring 66. Inner guide ring 61 and outer guide ring 63 are vertically oriented rings relative to the rotational axis of the drive sprocket 10. Further, inner guide ring 61 and outer guide ring 63 are substantially parallel.

Inner guide ring 61 is the inner most ring of intermediate ring 60 and outer guide ring 63 is the outer most ring of intermediate ring 60 relative to the tracked vehicle when drive sprocket 10 is installed onto the drive shaft of the tracked vehicle. Base ring 66 is located between inner guide ring 61 and outer guide ring 63.

Base ring 66 is a ring having a horizontally oriented width relative to the rotational axis of the drive sprocket 10. Base ring 66 extends in a substantially parallel manner relative to the rotational axis of sprocket 10, thereby bridging between inner guide ring 61 and outer guide ring 63. Further, inner guide ring 61 and outer guide ring 63 are oriented perpendicular to base ring 66. A base portion 61c of inner guide ring 61 is connected to first side 66a of base ring 66. A base portion 63c of outer guide ring 63 is connected to second side 66b of base ring 66. The transitions between inner guide ring 61 and base ring 66, and outer guide ring 63 and base ring 66 are radius corners.

Outer guide ring 63 has an interior edge 64. Outer guide ring 63 has tabs 65 positioned radially about interior edge 64. The radial positions of tabs 65 correspond to the radial positions of slots 74 of spokes 72, such that each tab 65 is fitted into a corresponding slot 74 located at an intermediate position 77 on spoke 72 between ring end 73 and distal end 75. Accordingly, as can be seen, intermediate positions 77 of spokes 72 are attached to outer guide ring 63 at interior edge 64.

As can be seen, inner guide ring 61, outer guide ring 63, and base ring 66 of intermediate ring 60 form substantially a "J" shape, or a "U" shape with an elongated leg on one side of the "U". Stated alternatively, inner guide ring 61, outer guide ring 63, and base ring 66 form the cross-section of intermediate ring 60, which in some embodiments is substantially a "J" shape, or a "U" shape with an elongated leg on one side of the "U".

Further, outer guide ring 63 has a first portion 63a and a second portion 63b. The first portion 63a extends from base portion 63c toward the center of outer guide ring 63 for a vertical distance of "C", which is substantially equal to the distance between base portion 61c and interior edge 62 of inner guide ring 61. Stated alternatively, the height of the first portion 63a of outer guide ring 63 is substantially equal to the height of inner guide ring 61. Second portion 63b extends from interior edge 64 to first portion 63a. Accordingly, as can be seen, in some embodiments, first portion 63a of outer guide ring 63, base ring 66, and inner guide ring 61 of intermediate ring 60 form substantially a "U" shape. Stated alternatively, first portion 63a of outer guide ring 63, base ring 66, and inner guide ring 61 form substantially a "U" shape cross-section of intermediate ring 60.

In some embodiments, outer guide ring 63 and inner guide ring 61 of intermediate ring 60 are substantially the same height, thereby outer guide ring 63, inner guide ring 61, and base ring 66 form substantially a "U" shape. Stated alternatively, in some embodiments, outer guide ring 63 and inner guide ring 61 of intermediate ring 60 are substantially the same height, thereby, in such embodiments, outer guide ring 63, inner guide ring 61, and base ring 66 form substantially a "U" shape cross-section of intermediate ring 60.

Figure 8:
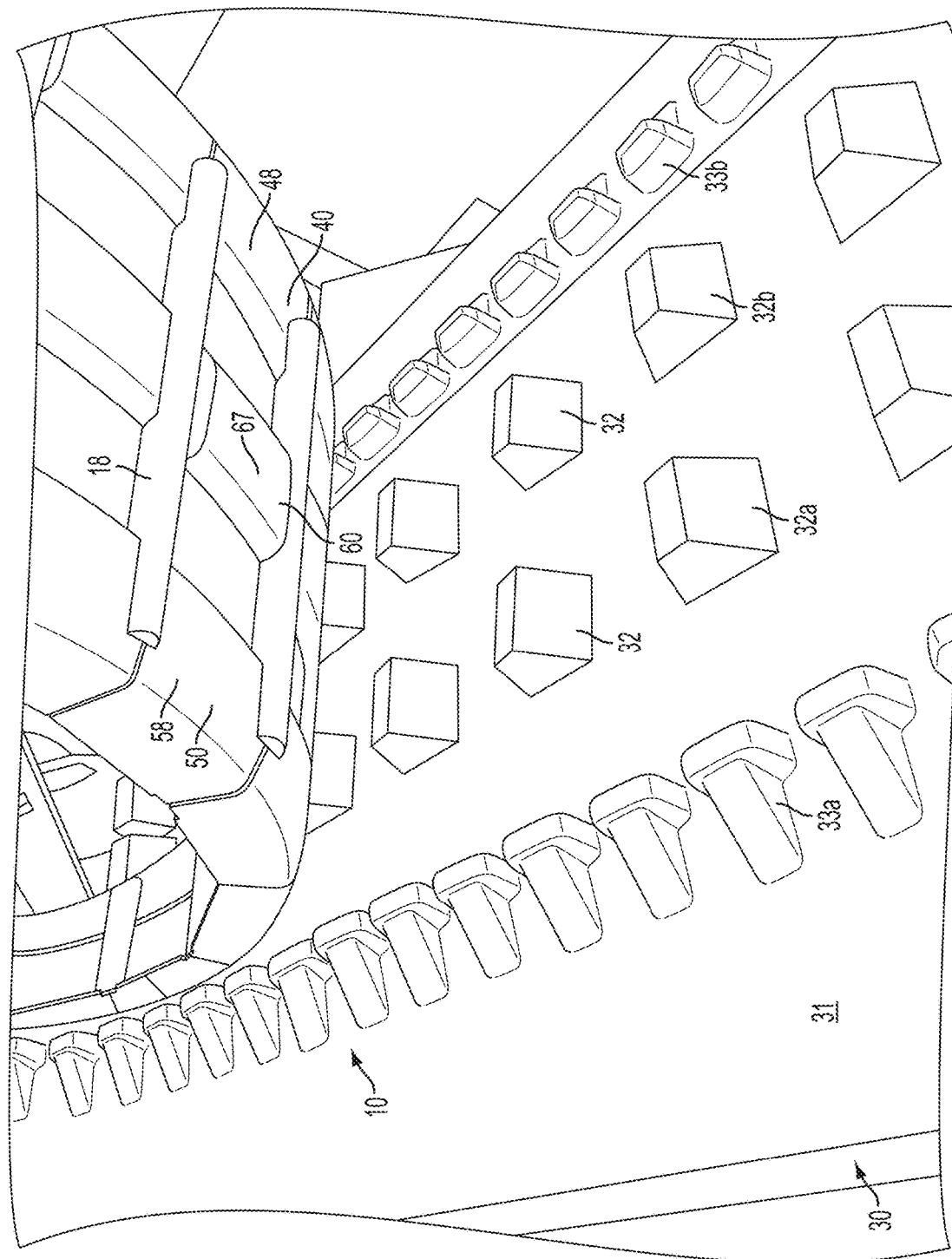
FIG. 8 is an isometric view of the front of a third exemplary embodiment of a drive sprocket on a tracked vehicle.

Turning to FIG. 8, a plurality of rods 18 are positioned about the radial periphery of the interior ring 40, exterior ring 50, and intermediate ring 60 of drive sprocket 10. The rods 18 are connected to the interior ring 40, exterior ring 50 and intermediate ring 60 such that a portion of each rod 18 extends laterally away from each of the interior ring 40, exterior ring 50, and intermediate ring 60 in a substantially parallel manner relative to the rotational axis of the drive sprocket 10. In an embodiment, a pair of rods 18 are positioned immediately adjacent to each other to form a cluster, and each cluster is spaced apart about the periphery of the interior ring 40, exterior ring 50 and intermediate ring 60. In an embodiment, the rods 18 are cylindrical, having a circular cross-sectional shape. It should be understood by one of ordinary skill in the art that the cross-sectional shape of the rods 18 can be any shape such as circular, square, triangular, or the like. The rods 18 are configured to engage the guide lugs 32 positioned on the inner surface 31 of track 30. In an embodiment, rods 18 do not extend beyond inner guide ring 41 of interior ring 40 and outer guide ring 55 of exterior ring 50 relative to the rotational axis of drive sprocket 10.

Figure 4:
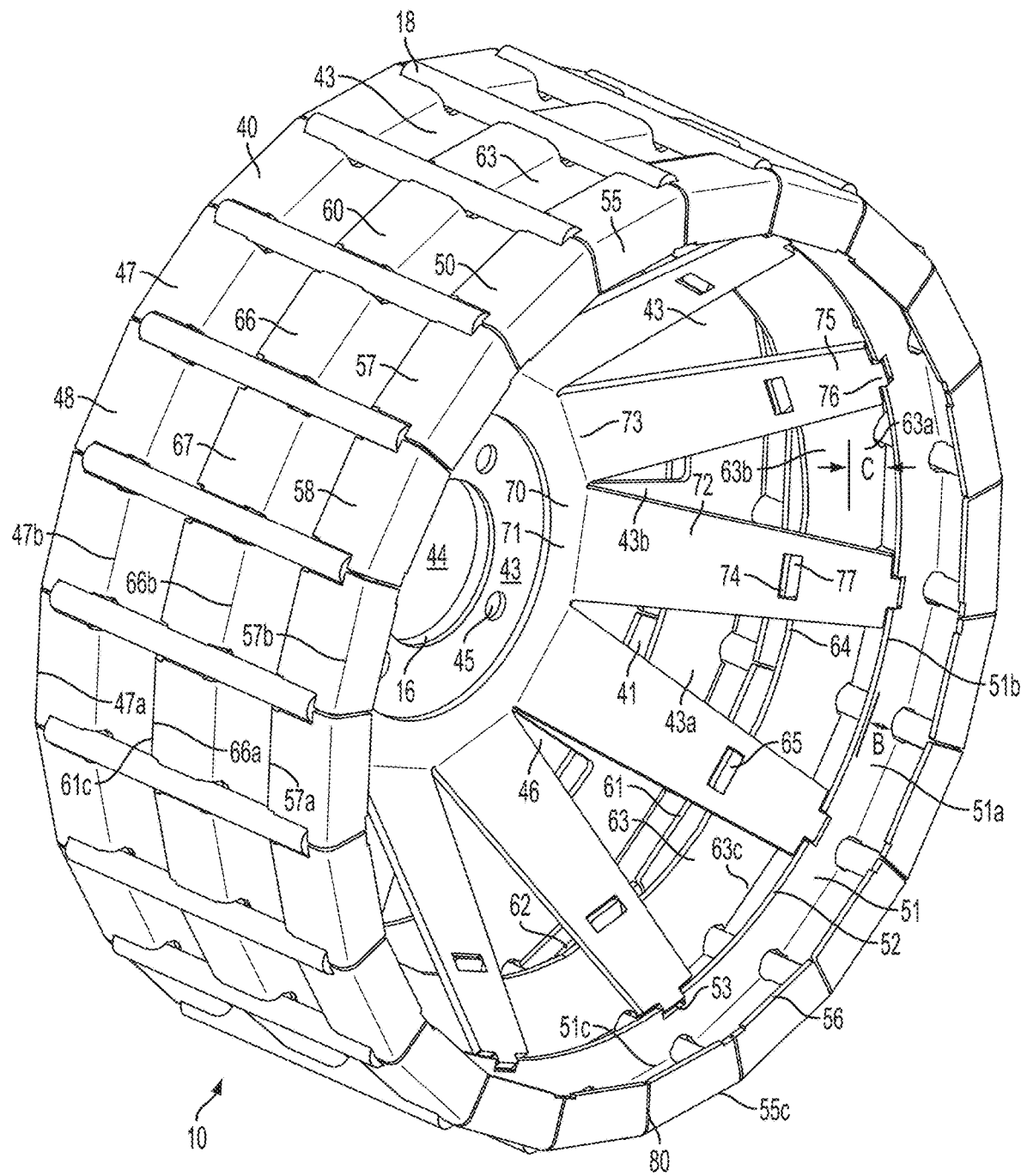
FIG. 4 is a perspective view of the front of a third exemplary embodiment of a drive sprocket.
Figure 5:
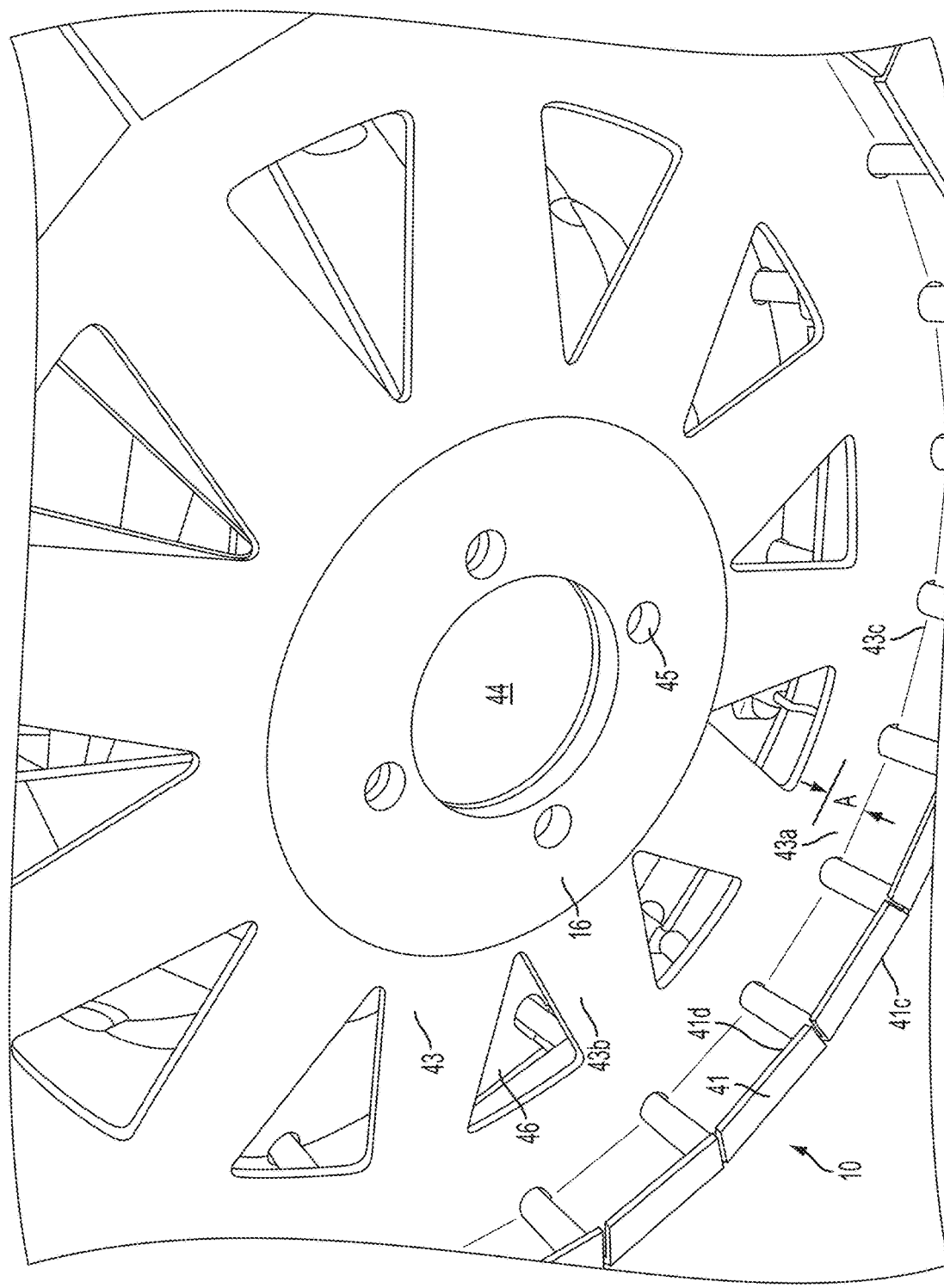
FIG. 5 is a perspective view of the back of a third exemplary embodiment of a drive sprocket.
Figure 6:
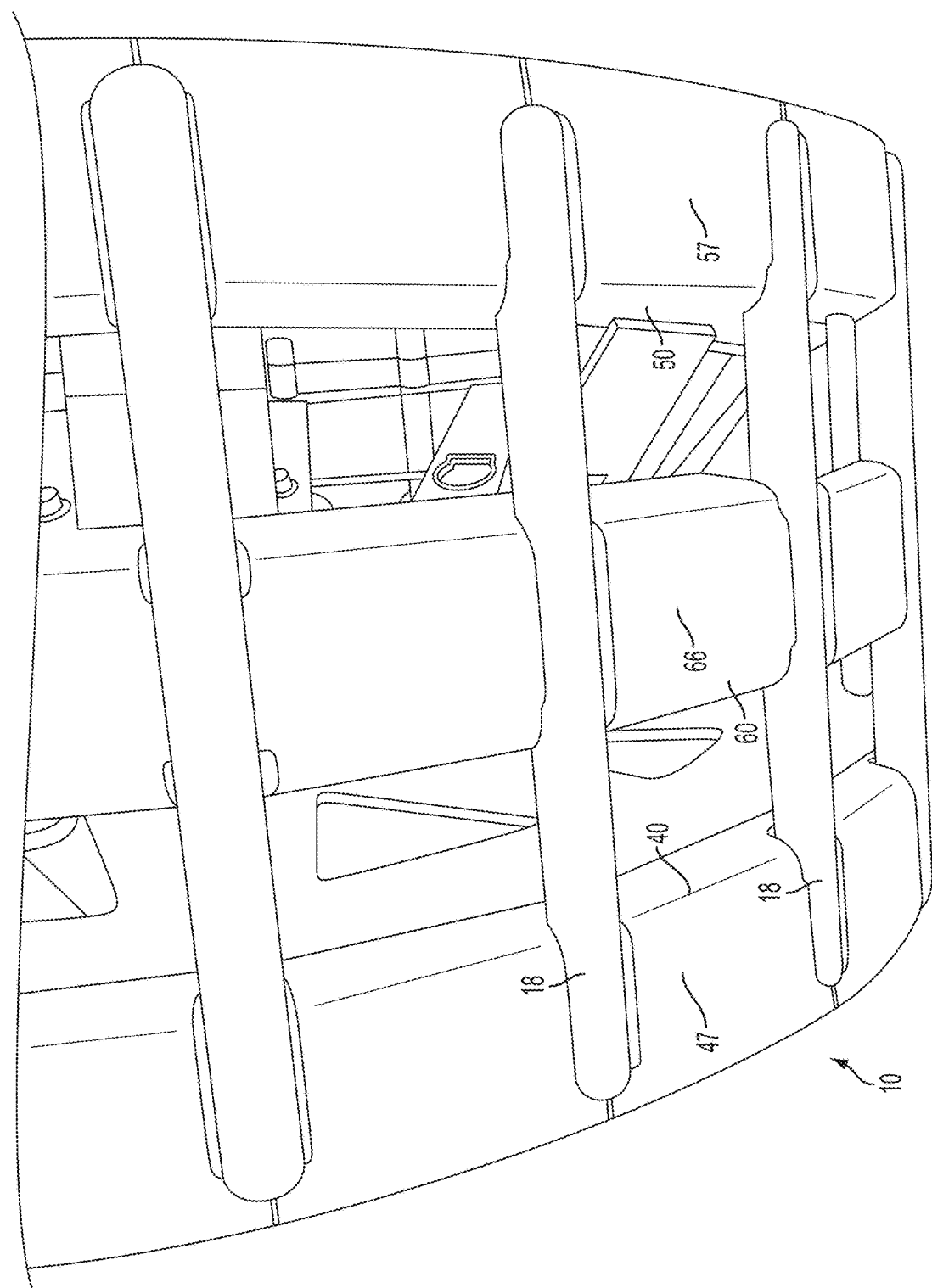
FIG. 6 is an end view of a third exemplary embodiment of a drive sprocket.

Turning to FIGS. 4, 6, and 8, in an embodiments rods 18 extend beyond the radial periphery of interior ring 40, exterior ring 50, and intermediate ring 60. Stated alternatively, the rods 18 extend beyond the outer peripheral surface 48 of the base ring 47 of interior ring 40, outer peripheral surface 58 of the base ring 57 of exterior ring 50, and outer peripheral surface 67 of the base ring 66 of intermediate ring 60. As such, the rods 18 extending beyond outer peripheral surfaces 48, 58, 67 ensure engagement with the base of each guide lug 32 of track 30. Further, outer peripheral surfaces 48, 58, 67 of base rings 47, 57, and 66 provide flat areas between rods 18 and the inner and outer guide rings 41 and 43 of interior ring 40, the inner and outer guide rings 51 and 55 of exterior ring 50, and inner and outer guide rings 61 and 63 of intermediate ring 60 of drive sprocket 10. The flat areas of outer peripheral surfaces 48, 58, 67 provide additional support to track 30 and structural strength to drive sprocket 10.

Drive sprocket 10 can be formed of aluminum, steel, or any other material sufficient to withstand the stresses experienced during driving a tracked vehicle, particularly the lateral stresses experienced during a turn.

Figure 7:
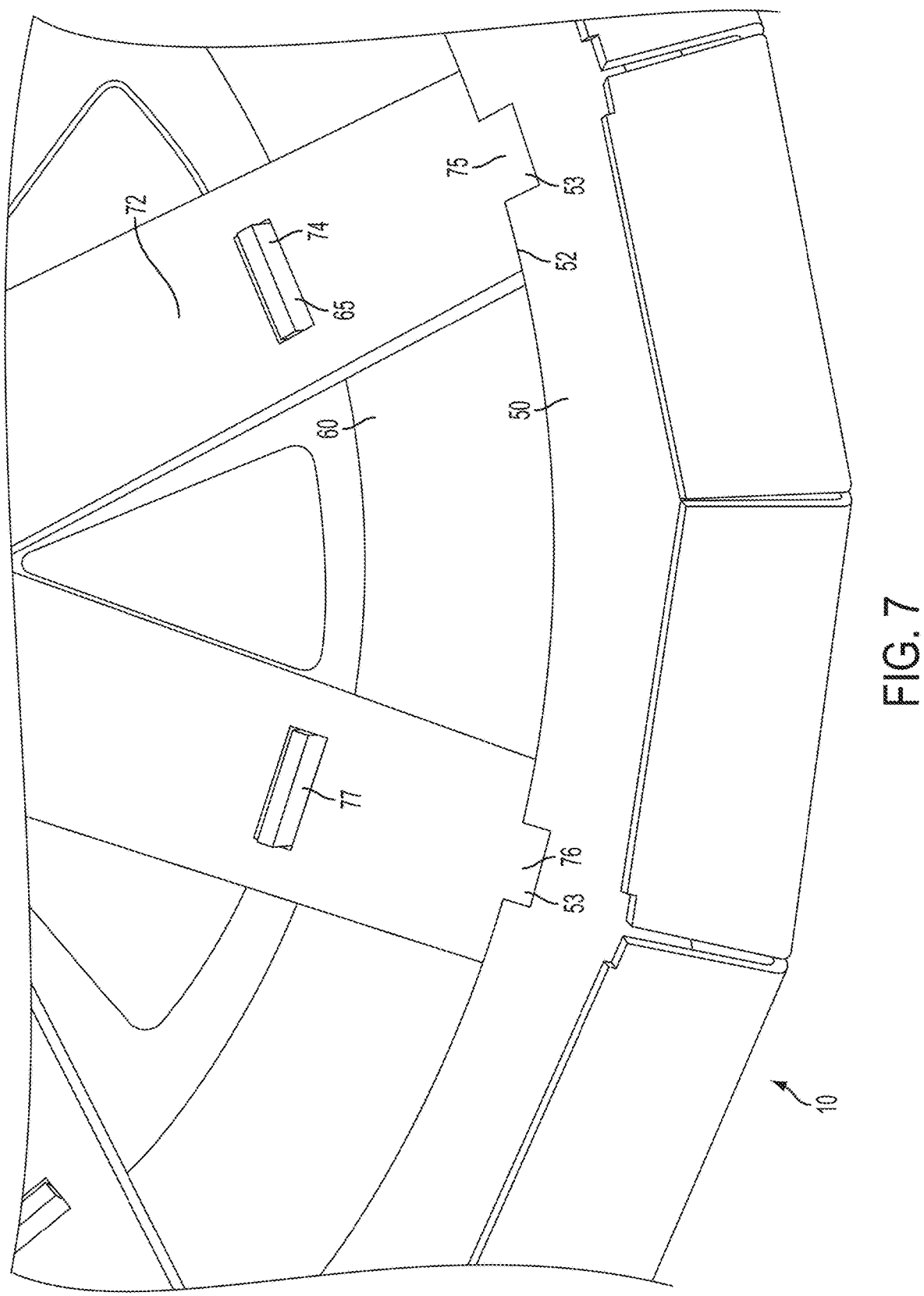
FIG. 7 is a close up front view of a third exemplary embodiment of a drive sprocket.

Turning to FIG. 7, in some embodiments, the distal end 75 of spokes 72 is fixed to inner guide ring 51 of exterior ring 50 by welding tab 76 to recess 53. Further, in some embodiments, the remainder of distal end 75 abutting of interior edge 52 is also welded to interior edge 52. Additionally, in some embodiments, the intermediate position 77 of spokes 72 is fixed to outer guide ring 63 of intermediate ring 60 by welding tab 65 protruding through slot 74 to spoke 72 at intermediate position 77.

As was stated above, turning to FIG. 8, each track 30 of tracked utility vehicle has a plurality of drive lugs 32 arranged in an annular pattern on the inside surface 31 of track 30. Accordingly, in operation, rods 18 of drive sprocket 10 engage a drive lug 32 of tracks 30 close to the traction drive lug pitch line, so as to reduce bending moments and stress on the drive lugs 32. Further, the "U" and/or "J" shape of the interior ring 40, exterior ring, 50, and intermediate ring 60 of drive sprocket 10 substantially fill the empty space between drive lugs 32, thereby squaring up rods 18 to drive lugs 32, which further reduces bending moments and stresses on the drive lugs 32 of tracks 30.

Further, as was stated above, the "U" or "J" shape of interior ring 40 substantially fills the space between interior guide lug 33b and interior drive lug 32b. Further, the "U" or "J" shape of intermediate ring 60 substantially fills the space between exterior drive lug 32a and interior drive lug 32b. Additionally, the "U" or "J" shape of exterior ring 50 substantially fills the space between exterior guide lug 33a and exterior drive lug 32a.

Additionally, turning to FIGS. 4 and 8, in some embodiments, discontinuities 80, as seen in FIG. 4, introduced into interior ring 40, exterior ring, 50, and intermediate ring 60 of drive sprocket 10 during the metal shaping process are filled in via welding to increase the rigidity of interior ring 40, exterior ring, 50, and intermediate ring 60, and drive sprocket 10. FIG. 8 shows an embodiment of drive sprocket 10 with filled/welded discontinuities 80.

What is claimed is:

1. A drive sprocket for driving a track of a tracked vehicle, said drive sprocket comprising:
    an interior ring, an exterior ring, and an intermediate ring situated between said interior ring and said exterior ring; said interior ring, said exterior ring, and said intermediate ring are oriented in a substantially spaced-apart manner and are parallel with one another, each of said rings having an outer peripheral surface; and
    a plurality of rods attached to said rings adjacent to said outer peripheral surface thereof;
    wherein an adapter is fixed to an outer guide ring of said interior ring, wherein said adapter is configured to be directed toward said tracked vehicle when said drive sprocket is mounted on said tracked vehicle.

2. The drive sprocket as recited in claim 1, wherein said interior ring has a substantially "U" or "J" shape.

3. The drive sprocket as recited in claim 2, wherein an inner guide ring, said outer guide ring, and a base ring of said interior ring form said substantially "U" or "J" shape of said interior ring, wherein said base ring is located between said inner guide ring and said outer guide ring.

4. The drive sprocket as recited in claim 2, wherein a base ring, an inner guide ring, and a first portion of said outer guide ring of interior ring form said substantially "U" shape of said interior ring.

5. The drive sprocket as recited in claim 2, wherein "U" or "J" shape of said interior ring is configured to substantially fill the space between an interior guide lug and an interior drive lug arranged in an annular pattern on an inside surface of a track.

6. The drive sprocket as recited in claim 1, wherein said exterior ring has a substantially "U" or "J" shape.

7. The drive sprocket as recited in claim 6, wherein an inner guide ring, an outer guide ring, and a base ring of said exterior ring form said substantially "U" or "J" shape of said exterior ring, wherein said base ring is located between said inner guide ring and said outer guide ring of said exterior ring.

8. The drive sprocket as recited in claim 6, wherein a base ring, an outer guide ring, and a first portion of an inner guide ring of said exterior ring form said substantially "U" shape of said exterior ring.

9. The drive sprocket as recited in claim 6, wherein said "U" or "J" shape of said exterior ring is configured to substantially fill the space between an exterior guide lug and an exterior drive lug arranged in an annular pattern on an inside surface of a track.

10. The drive sprocket as recited in claim 1, wherein said intermediate ring has a substantially "U" or "J" shape.

11. The drive sprocket as recited in claim 10, wherein a base ring, an inner guide ring, and a first portion of an outer guide ring of said intermediate ring form said substantially "U" shape of said intermediate ring.

12. The drive sprocket as recited in claim 10, wherein said "U" or "J" shape of said intermediate ring is configured to substantially fill the space between an exterior drive lug and an interior drive lug arranged in an annular pattern on an inside surface of a track.

13. The drive sprocket as recited in claim 1, wherein an inner guide ring, an outer guide ring, and a base ring of said intermediate ring form said substantially "U" or "J" shape of said intermediate ring, wherein said base ring is located between said inner guide ring and said outer guide ring of said intermediate ring.

14. The drive sprocket as recited in claim 1, a base ring of said interior ring is comprised of a flat outer peripheral surface located between said rods and an inner guide ring and said outer guide ring of said interior ring.

15. The drive sprocket as recited in claim 1, a base ring of said exterior ring is comprised of a flat outer peripheral surface located between said rods and an inner guide ring and an outer guide ring of an exterior ring.

16. The drive sprocket as recited in claim 1, said base ring of said intermediate ring is further comprised of a flat outer peripheral surface located between said rods and an inner guide ring and an outer guide ring of said intermediate ring.

17. The drive sprocket as recited in claim 1, wherein each of said plurality of rods is spaced-apart from adjacent rods.

18. The drive sprocket as recited in claim 1, wherein said plurality of rods form a plurality of clusters, wherein each of said clusters is formed of a pair of said rods and each of said clusters is spaced apart from adjacent clusters about said peripheral edge of said inner rings.

19. The drive sprocket as recited in claim 1, wherein said rods are cylindrically shaped having a circumferential surface.

20. The drive sprocket as recited in claim 1, wherein a portion of said circumferential surface of said rods extends radially outward away from said outer peripheral surface of said interior ring relative to a rotational axis of said drive sprocket.

21. The drive sprocket as recited in claim 1, wherein a portion of said circumferential surface of said rods extends radially outward away from said outer peripheral surface of said exterior ring relative to a rotational axis of said drive sprocket.

22. The drive sprocket as recited in claim 1, wherein a portion of said circumferential surface of said rods extends radially outward away from said outer peripheral surface of said intermediate ring relative to a rotational axis of said drive sprocket.

23. The drive sprocket as recited in claim 1, further comprising a spoke assembly fixed to said outer guide ring of said interior ring; said spoke assembly is configured to be directed away from said tracked vehicle when said drive sprocket is mounted on said tracked vehicle; said spoke assembly ring has a plurality of spokes projecting toward the radial periphery of said drive sprocket; said spokes form an acute angle with respect to said outer guide ring;

wherein each of said spokes has a ring end, a distal end, and an intermediate position located between said ring end and said distal end; said exterior ring is fixed to said distal end of said spokes and said intermediate ring is fixed to said spokes at said intermediate position.

\* \* \* \* \*